United States Patent [19]

Daane et al.

[11] 4,025,294
[45] May 24, 1977

[54] PARISON OVEN

[75] Inventors: Robert A. Daane, Rockton, Ill.;
Edward D. Beachler; Raymond C. Vonderau, both of Beloit, Wis.;
Nickolas N. Sokolow, Roscoe, Ill.

[73] Assignee: Beloit Corporation, Beloit, Wis.

[22] Filed: Sept. 19, 1975

[21] Appl. No.: 615,182

Related U.S. Application Data

[62] Division of Ser. No. 473,290, May 24, 1974, Pat. No. 3,930,788.

[52] U.S. Cl. .................................. 432/11; 432/12; 432/18
[51] Int. Cl.² .......................................... F27D 3/00
[58] Field of Search ............... 432/11, 12, 18, 124

[56] References Cited

UNITED STATES PATENTS

| 3,445,096 | 5/1969 | Seefluth | 432/11 |
| 3,477,700 | 11/1969 | Kinslow, Jr. | 432/124 |
| 3,556,494 | 1/1971 | Cines | 432/11 |
| 3,594,862 | 7/1971 | Seefluth | 432/124 |
| 3,894,835 | 7/1975 | Berggren | 432/11 |

Primary Examiner—John J. Camby
Attorney, Agent, or Firm—Dirk J. Veneman; Michael L. Gill; Gerald A. Mathews

[57] ABSTRACT

An oven for heating tubular parisons to a target or orientation temperature. A first plenum on one side of the oven and a second plenum on the opposite side of the oven, both exhaust to a common chamber disposed therebetween. The parisons are heated by a high velocity fluid above the target temperature in the zone defined by the first plenum and the chamber and the parisons are tempered by a lower velocity fluid at the target temperature in the zone defined by the second plenum and the chamber.

7 Claims, 2 Drawing Figures

PARISON OVEN

This is a division of application Ser. No. 473,290, filed May 24, 1974, now U.S. Pat. No. 3,930,788.

BACKGROUND OF THE INVENTION

This invention relates to blow molding of oriented hollow articles of thermoplastic material and more specifically to an oven for heating the parisons to a predetermined target or orientation temperature.

In recent years, there has developed techniques whereby blow molded articles can be produced having biaxial orientation, which articles have exceptional strength and highly desirable physical properties such as clarity. This technique involves forming of parison, cooling it to well below its melting point, and thereafter heating it to orientation temperature. The orientation temperature is just below the crystalline melt point in the case of crystalline materials and 40° to 225° F. below the homogeneous melt point for amorphous materials. Such techniques are disclosed in U.S. Pat. Nos. 3,288,317 and 3,390,426.

Ovens for heating such parisons can be found in U.S. Pat. Nos. 3,752,641 and 3,740,868, both of which are assigned to the present assignee. In ovens of this type, parisons are disposed on pin structures carried by a movable chain through the oven. Parisons were carried along a plurality of generally parallel paths in an upright position and hot air was forced from the bottom of the oven and exhausted through the top. An improvement was made in this type of oven in U.S. Pat. No. 3,801,623 and assigned to the present assignee in which an oven of this same general construction was utilized whereby the heated air was blown across the oven from one side to another for more effective heating. Two specific problems occurred: (a) it took considerable time to heat certain materials, such as polypropylene, and (b) there was a tendency for the outer parison wall in an axial direction to be hotter than the corresponding inner parison wall in an axial direction resulting in the formation of a nonuniform container.

What is desired then is a parison oven which can reduce the time needed for heating parisons and thereby increase production thereof, and an oven for more uniformly heating the parisons so that the peripheral walls of the parisons have a temperature approximately equal to corresponding portions on the interior walls of the parisons.

SUMMARY OF THE INVENTION

In accordance with this invention, an oven is provided for heating tubular thermoplastic parisons up to a target temperature approximately equal to its orientation temperature. The oven includes transporting means for carrying the parison through the oven. Furthermore, on one wall of the oven is means defining a first plenum chamber for supplying a first heating fluid in a cross flow direction. On the opposite side of the oven is means defining a second plenum chamber for supplying a second heating fluid in a cross flow direction opposed to said first heating means. Disposed between the first and second plenum is an exhaust chamber. The exhaust chamber and the first plenum define a first heating zone and the exhaust chamber and the second plenum define a second heating zone.

In the first zone, parisons are quickly heated by a heating fluid supplied at high velocity and at a temperature higher than the target temperature. In the second zone, the parisons are tempered by a lower velocity heating fluid supplied to said second zone at a temperature approximately equal to the target temperature. Therefore, in the first zone the parisons are quickly heated and in the second zone, the parisons are tempered to enable equalization between the temperatures of the periphery of the parison and those correspondingly on the inside of the parison.

What is disclosed then is an oven which substantially decreases the heating time required for the parisons, and furthermore, provides more uniformly heated parisons for the subsequent blow molding operation.

DETAILED DESCRIPTION OF THE INVENTION

Figure 1:
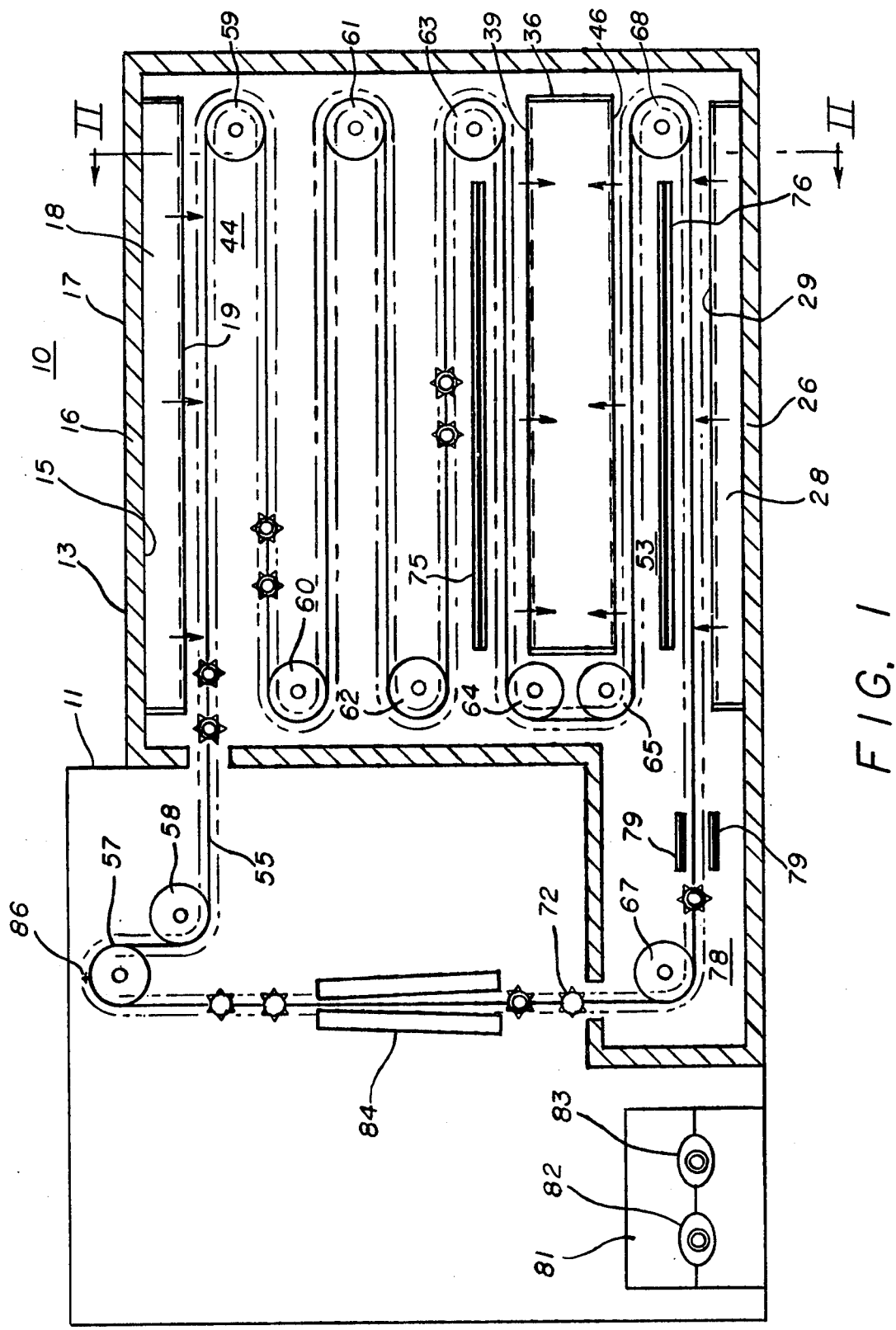
FIG. 1 is a schematic representation of a plan view of the blow molding machine utilizing the oven formed in accordance with the principles of the present invention.

Referring to the drawings, there is generally shown an oven 10. The oven 10 is supported on a base structure 11. The oven 10 is generally comprised of an outer wall member 13 and an inner wall member 15. Disposed therebetween is a suitable insulating wall member 16.

A first plenum 18 is disposed on a first wall 17 of the oven 10. The plenum 18 has a wall member 19 facing the interior of the oven which includes a solid bottom portion 20, a solid top insulated portion 21 and a perforated plate middle portion 22. The perforated plate 22 is fastened to the bottom and top portions 20 and 21 by any suitable means, not shown. An inlet opening 24 is disposed in the bottom wall of the plenum 18.

On a second wall 26 of the oven 10, there is disposed a second plenum 28. A wall 29 of the plenum 28 facing the oven includes a solid bottom portion 30, a solid top portion 31, and a middle portion comprising a perforated plate member 32. The perforated plate 32 is securely fastened to the bottom and top portions 30 and 31, respectively, by any suitable means, not shown. In the bottom wall partially defining the second plenum 28, is a suitable inlet opening 34.

An exhaust chamber 36 is disposed between the first plenum 18 and the second plenum 28. The exhaust chamber 36 includes a wall 39 extending between the top and bottom of the oven 10. The wall 39 includes a bottom portion 40, a top portion 41, and an intermediate portion comprising a perforated plate 42, fastened thereto. The wall 39 of the exhaust chamber 36 and the wall 19 of the plenum 18 define a first heating zone 44. Another wall 46, which defines another portion of the exhaust chamber 36, includes a bottom portion 47, a top portion 48, and an intermediate portion 49, which includes a perforated plate. The perforated plate 49 is firmly secured to the bottom and top portions 47 and 48, by any suitable means, not shown. On the bottom of the exhaust chamber 36 is disposed an outlet opening 51, which is disposed in the bottom wall thereof. The wall 46 of the exhaust chamber 36 and the wall 29 of the second plenum define a second heating zone 53.

The parison transporting means includes a chain 55 which defines six passes through the first heating zone 44 and two passes through the second heating zone 53. A driving roll 57, disposed outside of the oven 10, drives the chain 55 around idler rolls 58 through 67 in substantially back and forth parallel passes.

Figure 2:
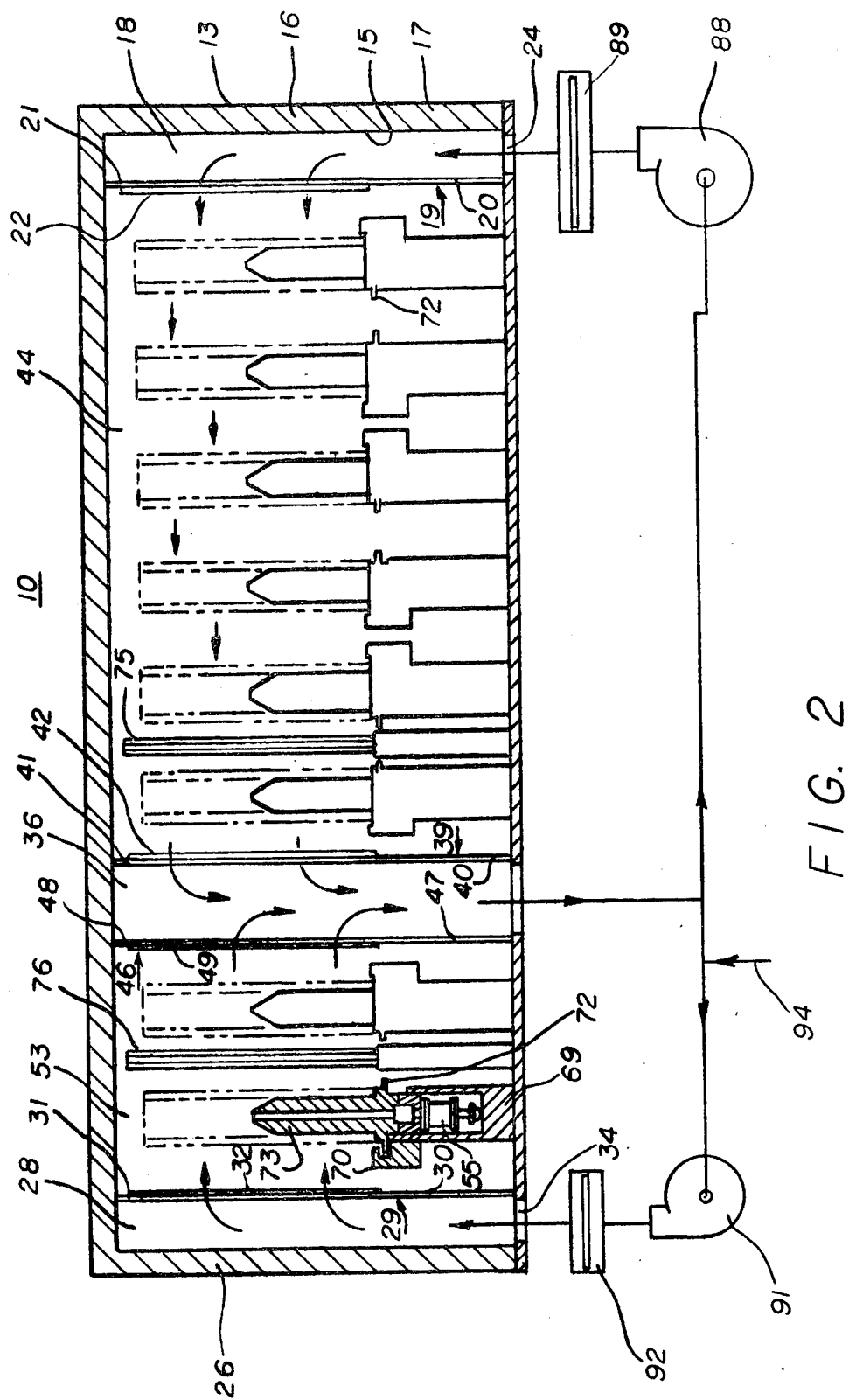
FIG. 2 is a view taken along lines II-II in FIG. 1 and on an enlarged scale.

As best seen in FIG. 2, the chain 55 is enclosed within support structures 69 which are fastened to the bottom of the oven 10. On the upper portion of support structure 69, is a friction member 70 disposed on alternate sides of the support structures 69 depending on the numbered pass. Conical shaped pin members 73 are carried by the chain 55 at spaced intervals and rotatable star wheels are secured thereto. As the chain 55 is driven by the roll 57, the star wheels 72 engage the friction members 70 to rotate the star wheels, pin members 73, and any parisons disposed thereon (shown in phantom).

Electrical resistance strip heaters 75 are disposed between the last two chain passes in the first heating zone 44. Strip heaters 76 are disposed between the two passes in the second heating zone 53. After the last pass, in the second heating zone 53, the chain continues to the picking station 78 and goes between strip heaters 79, which are generally used for oval shaped bottles.

Two or more parisons can be picked at the picking station 78 by a picker arm (not shown) and carried to the mold station 81. At the mold station 81, there is shown two oval shaped cavities 82 and 83 for blowing the tubular shaped parison into an oval container, although any suitable shaped container can be formed.

The chain 55 continues around idler roll 67 and leaves the oven 10. Any parisons left on the star wheels 72 and pins 73 are removed at the missed parison removal station 84. The chain then continues to driving roll 57 where parisons are fed onto the star wheels and pin members at loading station 86 by means, not shown.

Heated air is circulated by centrifugal blower 88 through heater 89 to the inlet opening 24 of first plenum 18 where the heated air is forced through the perforated plate 22 of the wall 19. The air is forced across the first heating zone 44 and is removed through the perforated plate 42 of the wall member 39 partially defining the exhaust chamber 36. Air is also blown through centrifugal blower 91, and heater 92 to the inlet opening 34 of second plenum 28. The air is forced through the perforated plate 32 of the wall 29 and flows across the second heating zone 53. The air exits through the perforated plate 49 of the wall 46 partially defining the exhaust chamber 36. The air is then exhausted through the outlet opening 51 of the exhaust chamber 36 and is recirculated to both centrifugal blowers 88 and 91. Any necessary makeup air is fed in through line 94.

As previously indicated, the main problems experienced in the previous ovens were the length of time required to heat parisons, and nonuniformity in the heating of the parisons. It has been unexpectedly discovered that by dividing the oven into two heating zones, the velocity and temperature of the heating fluid in a first zone can be increased substantially above prior velocity and temperature of the heating fluid. Furthermore, by increasing the velocity, there will be a corresponding decrease in the scale of stray air or eddy currents which enables a more uniform heating of the prisons. Another effect of increased velocity is less heat loss (per lb. of air flowing through the oven) due to heat exchange with the oven walls. There is also a reduction in any natural convection air currents and consequently, a more uniform and constant air temperature throughout the heating chamber. Finally, by adding a second zone or tempering zone, a more uniform and equally heated parison can result. This unexpectedly substantially reduces cycle time and also forms a much more uniform, clearer, and stronger container.

It is desirable to reheat parisons just below the crystalline melt point in the case of crystalline materials and between 40° and 225° F. between the homogeneous melt point for amorphous materials. This is commonly called the orientation temperature. The final temperature the parisons are heated to is in this instance slightly higher than the orientation temperature since there will be some small temperature loss in moving the parisons from the picking station 78 to the mold 81. In the prior art ovens, it was common to have the heated air blown through the heating zone at approximately 800 cubic feet per minute. Because of the large volume of the single zone, plus the relatively poor air flow, there were substantial stray eddy currents and nonuniform temperatures in the oven. Temperature variations at the same point in the oven were as high as 20° F. The outer walls of the parisons were subjected to localized hot spots and the inner walls of the parisons, because of low thermal conductivity, had substantial temperature variations at an axial point versus the corresponding radial points on the outer walls.

According to the principles of this invention, the oven was divided into two zones 44 and 53. High velocity and a higher temperature heating fluid is introduced in the first zone and high velocity fluid at the target temperature equalizes or tempers the parisons in the second zone. An increase of the velocity of the heating fluid in zone 44 greatly minimizes the eddy currents, thereby forming an atmosphere of substantially more uniform temperature. For example, in zone 44 the velocity of the heating fluid was increased from about 800 cubic feet per minute to about 3,000 cubic feet per minute.

However, there is a theoretical upper limit to the increase in velocity of the heating fluid as well as a practical cost limitation. The parisons are supported on one end by the star wheel 72 and conical member 73. This in effect is a cantilevered structure. By increasing te velocity of the fluid, there is a greater deflection on the free end or unsupported end of the parison. If there is sufficient deflection at the free end of the parison, the parison picking arm at the picking station 78 will not effectively pick the parison, and when a deflected parison is deposited in the mold 81, a defective container is formed. The amount of deflection which is acceptable varies depending on the material used, the diameter and thickness of the parison, and the height of the parison. The oven is designed so that the velocity of the heating fluid forced from the first plenum 18 into the first zone 44 is just below the velocity causing sufficient deflection to the parison so that an unsatisfactory container is formed, this upper limit hereinafter being defined as the "distortion velocity". The concept of distortion velocity is also applicable to, for example, a parison supported at both ends whereby the deflection occurs in the middle of the parison.

Another theoretical upper limit to air velocity is the "tipping" velocity or velocity which the parison would tip over before actual distortion occurred. Therefore, either the distortion velocity or the tip over velocity is the theoretical upper limit, depending on the type of material and the size of the parison used.

By increasing the velocity of the heating fluid to a velocity less than, but approaching the distortion velocity or tipping velocity, there is a substantial reduction in scale of eddy currents, and a marked reduction of temperature variation. The heating rate is also increased and there is a corresponding reduction in cycle time. A more uniform temperature in the oven heats the parison more uniformly resulting in an improved blow molded container.

It has also been found that by increasing the velocity of the heating fluid at the same temperature, there is even a greater temperature variation between the inner and outer walls of the parisons. The temperature in the second zone is maintained at the target temperature and the heating fluid is supplied at a rate to minimize air currents and effect proper heat transfer from the outer surface to the inner surface of the parison to obtain a temperature leveling.

It has also been discovered that the heat transfer effectiveness can be increased by supplying heating fluid of a higher temperature that was previously supplied to the first zone 44. The parisons will be heated to just below the distortion temperature, i.e. that temperature which if the material is heated to, will cause sufficient damage to at least a portion of the parison surface so that an unsatisfactory container is formed. The upper limit of the distortion temperature will be just below the crystalline melting point for crystalline materials and just below the homogeneous melt point for amorphous materials. The lower level for this temperature will be just above its target temperature.

As the parisons are heated in the first zone by the high velocity, high temperature heating fluid, nonuniform localized hot spots on the outer periphery of the parisons result. Portions of the outer walls are above the target temperature and the inner walls of the parisons are below the target temperature. The parisons are then conveyed to the second zone 53 which is maintained by heated fluid from the second plenum at the target temperature. The heating fluid blowing across the parisons at the target temperature provides a tempering zone so that equalization of temperatures or a temperature leveling between the inner and outer walls can be achieved, i.e. hot areas on the outer walls, cool and the cool inner walls increase in temperature, both walls approaching the target temperature.

Additional heating means may be used, such as the strip heaters 75 and 76 to program the parisons for forming certain shaped containers. In the fifth and sixth passes, certain portions of the parisons in an axial direction can be additionally heated by means of strip heater 75. This localized heating in an axial direction is continued in the seventh and eighth passes in the second zone 53 by means of strip heater 76. The tempering zone in the second chamber 53 also tends to equalize the temperature of the parisons even when programmed, i.e. the temperature at a given height in an axial direction will tend to be hotter on both the internal wall and the exterior wall depending on the placement of the programmed heater. Finally, heaters 79 can be utilized to heat parisons on each side which can be specifically utilized for oval shaped bottles. The parisons going through the area defined by the heater 79 do not rotate in contrast to the continuing rotation of the parison through the first and second zones 44 and 53, respectively.

Example 1: In a previous machine, parisons made of polypropylene were utilized having a 6 inch axial length, 1.3 inch outside diameter, and a 0.175 inch wall thickness. The oven temperature was approximately 326° F. and the air volume going through the oven was 800 cfm. The resultant bottle, with five oven passes, took 34.5 minutes to heat, and provided six to seven parisons per minute to the blow molding station.

Example 2: An oven formed in accordance with the principles of the present invention and utilizing polypropylene parisons of substantially the same dimensions and characteristics as those given in Example 1, have the following parameters. In the first heating zone, the air was provided at 3,000 cfm at 350° F. The heating air was 326° in the tempering zone at a flow rate of 1,000 cfm. There were six passes in the primary zone and two passes in the tempering zone. Eighteen parisons per minute were provided to the blow molding station. Besides having a one-thrid decrease in heating time, and an increase in the amount of parisons provided per minute, the resulting molded containers showed a marked increase in homogeneity, clarity, and material distribution because of the increased accuracy and uniformity in heating.

The above examples are given for the purpose of showing the magnitude of improvement between the prior art oven vs. the improved oven, but of course the flow rates, temperatures, time cycles, etc., will substantially change depending upon the type of material, wall thickness, and size of parisons used.

In summary then, it can be seen that the parison oven disclosed has divided the functions between quickly heating the parisons and uniformly heating the parisons. In the first zone, the parisons are heated at a temperature above the target temperature, but below the melting point of the parisons. The air velocity in the first zone is slightly below the distortion velocity. The higher velocity fluid also tends to miminize eddy currents and flow distribution, therefore also providing more uniformly heated parisons. The parisons are transferred to the second zone whereby a lower temperature fluid substantially equal to the target temperature, is provided to equalize the wall temperatures between the inner and outer walls of the parisons. The resulting oven heats the parisons to the target temperature more quickly and more uniformly than presently possible.

While only one embodiment has been shown, it will be obvious to those skilled in the art that various modifications can be made without departing from the scope and spirit of the invention.

What is claimed is:

1. A method of heating hollow thermoplastic parisons having inner and outer walls to a target temperature approximately equal to its orientation temperature in an oven including the steps of:
   1. placing said parisons in an oven;
   2. heating at least a portion of said parisons by contacting said parisons with fluid at a temperature above said target temperature;
   3. heating at least a portion of the parisons to a temperature below the distortion temperature of said thermoplastic parison, said distortion temperature being defined as that temperature which if the material is heated to, will cause sufficient damage to at least a portion of the parison surface so that an unsatisfactory container is formed; and
   4. applying a fluid at the target temperature to the parisons to equalize the temperature of the inner and outer walls by lowering the temperature of the hotter outer wall and raising the temperature of the inner walls and thereby cause both walls to approach the target temperature.

2. The method recited in claim 1 wherein step 3, the parisons are soaked in a portion of the oven at the target temperature at a different location where the parisons were heated to above said target temperature.

3. A method of heating hollow thermoplastic parisons to a target temperature approximately equal to the orientation temperature of the plastic in an oven including the steps:
   1. heating fluid to at least said orientation temperature of said thermoplastic parisons;
   2. raising the velocity of the fluid to a velocity slightly below the distortion velocity of the parisons, said distortion velocity being defined as that velocity which deflects a parison sufficiently so that a defective container will be formed by said parison; and
   3. supplying said fluid at least at said target temperature and said velocity slightly below the distortion velocity to said oven and transversely across said parisons to heat the parisons.

4. The method recited in 3 where in Step 1 the fluid is heated to a temperature slightly below the melting temperature of the thermoplastic parisons.

5. The method recited in claim 3 wherein in step 1 the fluid is heated to a temperature slightly below the melting temperature of the thermoplastic parsons, wherein a portion of the fluid is heated to a temperature substantially equal to the target temperature, and after Step 3 in claim 3 said heating fluid is then supplied to the parsons at the target temperature, to equalize the temperature of the parsons.

6. The method recited in claim 3 wherein said oven defines first and second heating zones;
   supplying heating fluid at a temperature slightly below the melting temperature of the parisons to said first heating zone; and
   supplying heating fluid at said target temperature to said second heating zone.

7. The method recited in claim 6 and including the steps of supplying fluid to said second heating zone at a velocity less than the velocity of fluid in the first heating zone.

\* \* \* \* \*